United States Patent [19]
Mendick, Jr.

[11] Patent Number: 5,235,772
[45] Date of Patent: Aug. 17, 1993

[54] CAMOUFLAGE FOR BOW HUNTERS

[76] Inventor: James L. Mendick, Jr., 833 Bellevue Ave., Hulmeville, Pa. 19047

[21] Appl. No.: 898,838

[22] Filed: Jun. 15, 1992

[51] Int. Cl.⁵ .................................... A01M 31/00
[52] U.S. Cl. ............................ 43/1; 124/23.1; 124/86; 135/901
[58] Field of Search .............. 43/1; 135/901; 124/86, 124/23.1; 40/604

[56] References Cited

U.S. PATENT DOCUMENTS

| | | | |
|---|---|---|---|
| 3,138,886 | 6/1964 | Cobb | 40/604 |
| 3,179,102 | 4/1965 | Peckham | 124/23.1 |
| 3,182,414 | 5/1965 | Shediker | 40/604 |
| 4,368,586 | 1/1983 | Forzelias | 40/604 |
| 4,817,579 | 4/1989 | Mathias | 124/86 |
| 4,876,817 | 10/1989 | Hill | 43/1 |
| 4,974,575 | 12/1990 | Mitchell | 135/901 |
| 5,127,180 | 7/1992 | Norton | 43/1 |

*Primary Examiner*—Kurt C. Rowan
*Attorney, Agent, or Firm*—Pollock, Vande Sande & Priddy

[57] ABSTRACT

A camouflage shield for a bow which includes upper and lower curved wire frame members which are covered with camouflage fabric. Each frame member includes an inner end section, an outer arcuate convex end section and brackets for attaching the frame members to the bow.

19 Claims, 3 Drawing Sheets

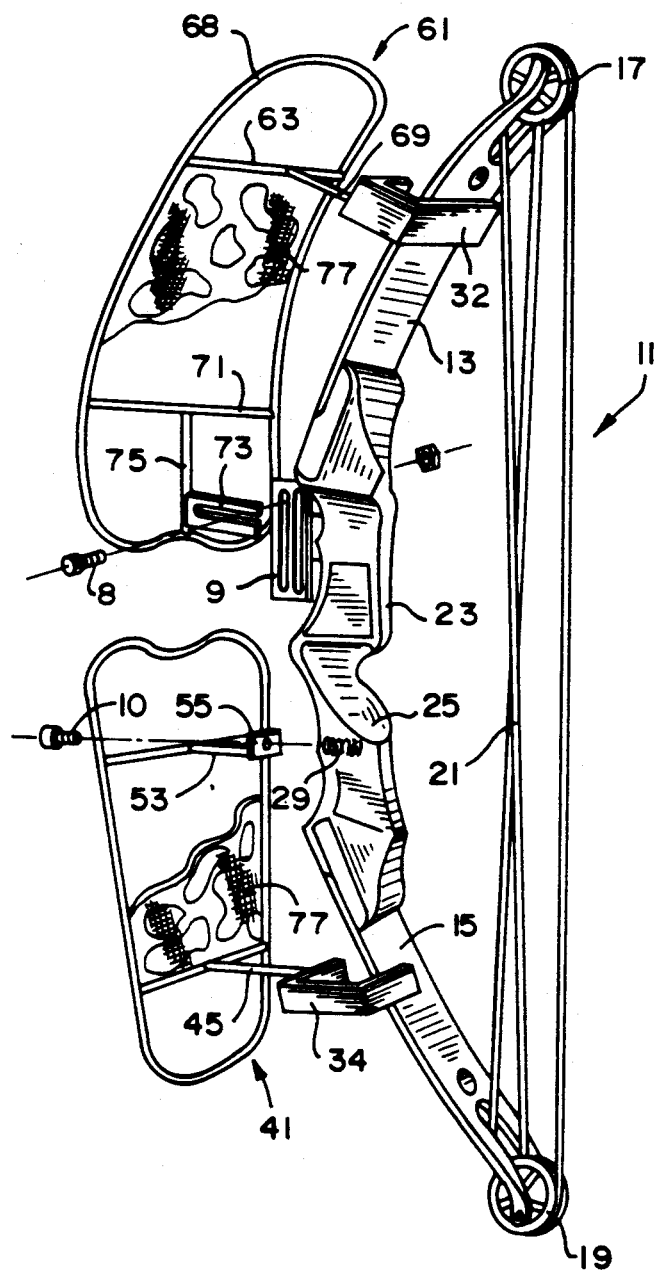
FIG_1
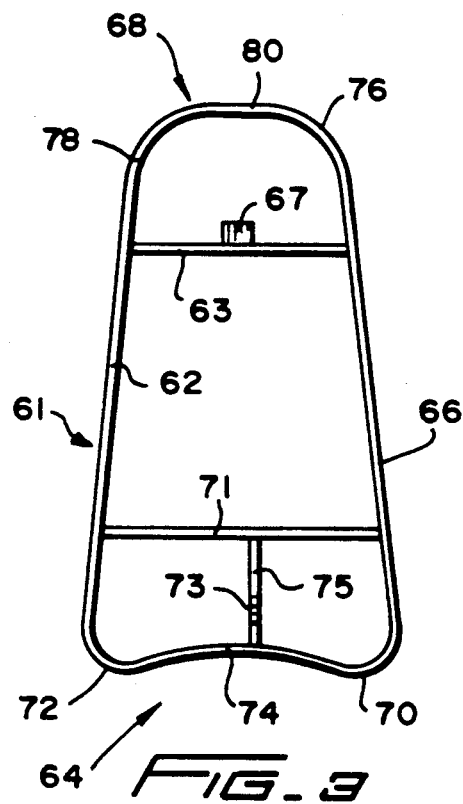
FIG_3
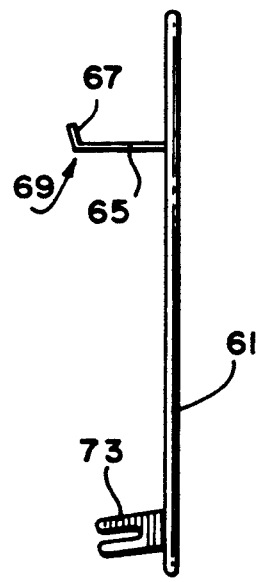
FIG_4

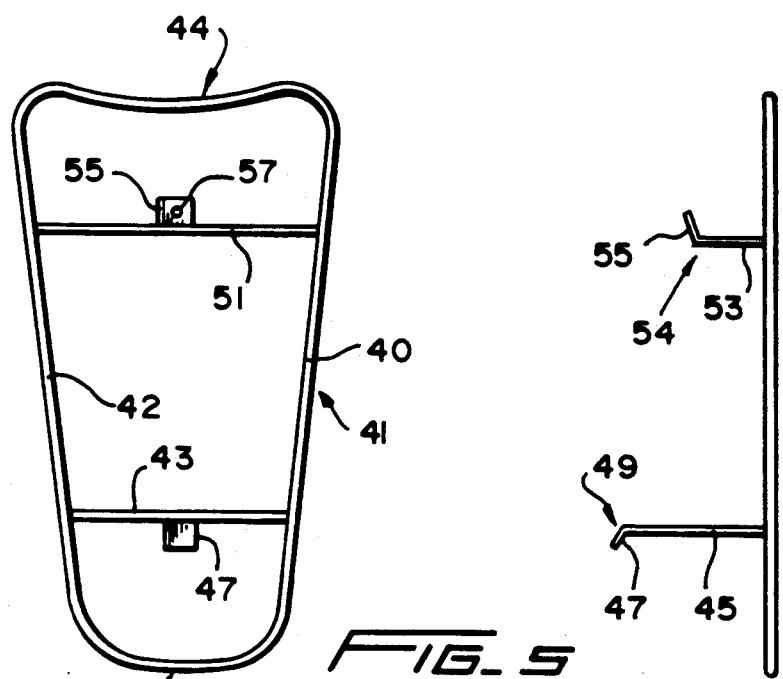
FIG_5
FIG_6
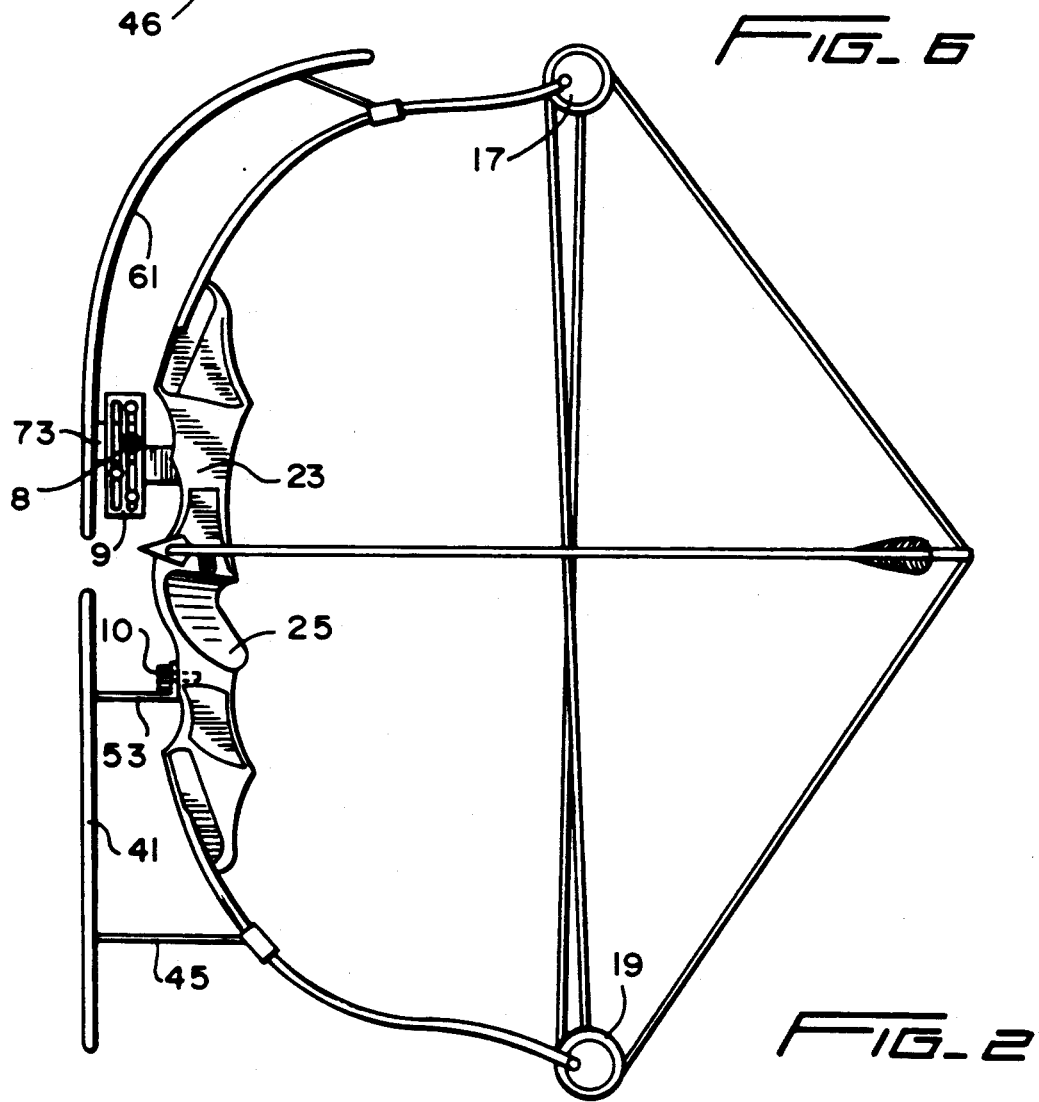
FIG_2

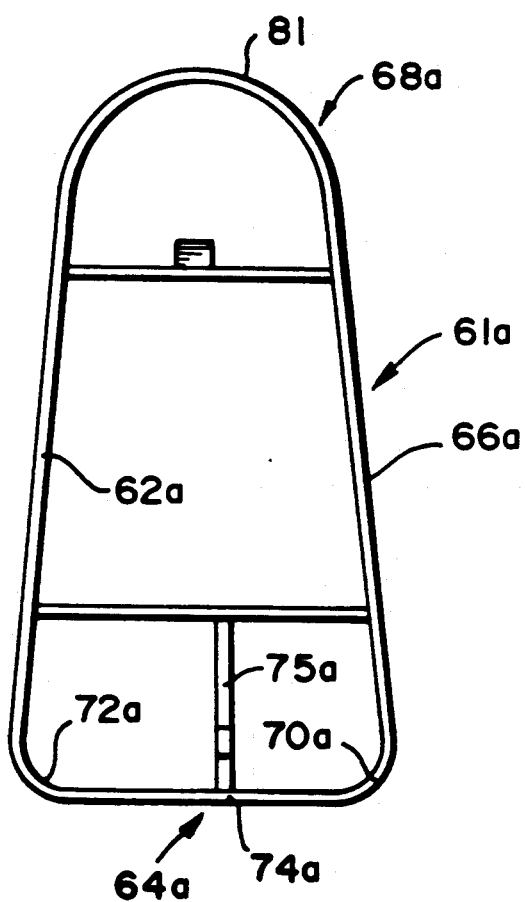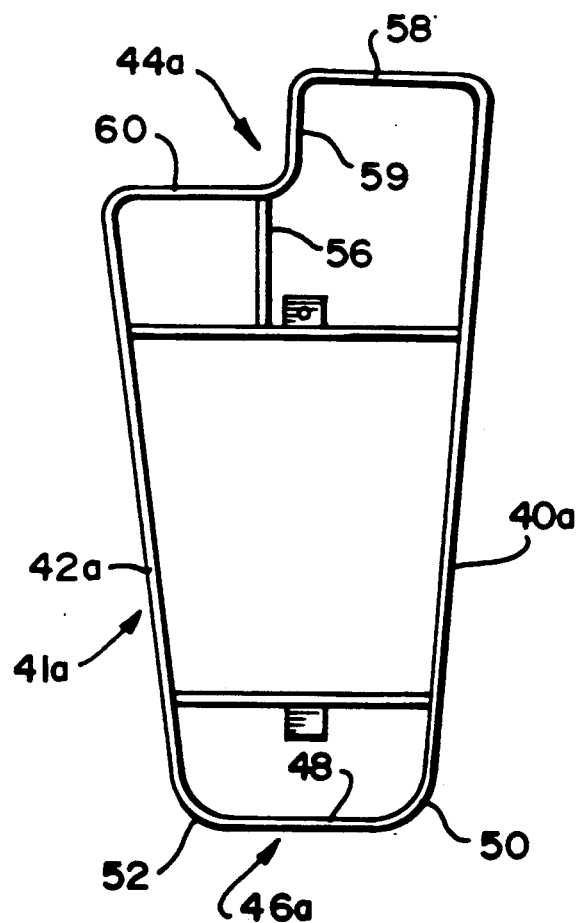

CAMOUFLAGE FOR BOW HUNTERS

This relates to the field of bow hunting, and more specifically to a camouflage shield for concealing an archer from game that is being hunted.

BACKGROUND OF THE INVENTION

Camouflage devices for concealing bow hunters from game are known and typically include a frame, camouflage fabric secured to the frame, and mounting elements for securing the fabric-covered frame on a bow. See, for example, U.S. Pat. No. 4,817,579 to Mathias, which describes a camouflage device which includes a fabric-covered rectangular frame arranged to be adjustably and detachably mounted on a hunting bow. The frame comprises a vertical central frame member which supports a pair of oppositely disposed C-shaped frame members. The resulting planar frame is attached to a bow by an arm which is secured to the bow.

See also U.S. Pat. No. 3,179,102 to Peckham U.S. Pat. No. 4,876,817 to Hill, and U.S. Pat. No. 4,974,575 to Mitchell, each of which describes a camouflage shield for archers in which the shield is a relatively large rectangular structure mounted on a bow.

These prior art camouflage devices serve the purpose of concealing a hunter once he has moved into position; however, the relatively large rectangular shapes having right angle corners tend to snag on vegetation and cause difficulties when moving through brush or when climbing into a blind in a tree. While some of these difficulties can be overcome by those camouflage devices which are readily detached from the bow and reattached when the hunter is in position, it would be preferable to be able to move into position with the camouflage in place.

SUMMARY OF THE INVENTION

It is accordingly one object of the present invention to provide an improved camouflage shield for use with a hunting bow.

In accordance with the present invention, there is provided a camouflage shield for a hunting bow having a centrally located handle riser member and upper and lower limbs secured thereto. The camouflage shield includes upper and lower wire frame members which are covered with camouflage fabric. Each wire frame member forms a closed curviform loop defining an opening and includes an inner end wire section, an outer end wire section having an arcuate convex portion, and a pair of substantially straight wire side sections connecting the inner and outer end wire sections to form the closed curviform loop. Fastening members are provided for securing the upper wire frame member to the upper limb of the bow, and the lower wire frame member to the lower limb of the bow, the wire frame members being oriented so that the inner end wire sections face each other near the handle riser member.

The word "curviform" as used herein is intended to refer to wire frame member configurations which contain curved or arcuate portions and, while it may include straight portions, excludes configurations which have intersecting straight lines or angles.

The term "simple curve" refers to a circular arc joining two tangents.

The term "compound curve" refers to a curve made up of two simple curves, each having a common tangent point at their junction and lying on the same side of the tangent.

The term "reversed curve" refers to a curve made up of two simple curves having a common point of tangency and lying on opposite sides of the common tangent.

The term "inner end section" refers to the section of the wire frame which is to be secured to the bow handle.

The term "outer end section" refers to the section of the wire frame which is secured to the outer end of a limb of the bow.

The camouflage shield of the present invention is compact and does not have sharp corners which could snag on vegetation when moving through brush; consequently, the camouflage shield can remain securely attached to the bow while the hunter is moving into position. The confronting wire end sections near the center of the bow provide a line of sight and an aperture through which an arrow can pass.

The division of the camouflage shield into two parts, i.e., an upper wire frame member and a lower wire frame member, results in a shield which readily flexes with the bow, causing little or no interference with the bow action.

BRIEF DESCRIPTION OF THE DRAWINGS

FIG. 1 is a perspective view of a compound bow showing the camouflage shield of the present invention, and means for mounting the shield components on the bow.

FIG. 2 is a side view of the bow of FIG. 1 in a drawn position showing the camouflage shield mounted on the bow.

FIG. 3 is a plan view of the upper wire frame member of the camouflage shield of the present invention.

FIG. 4 is a side view of the upper wire frame member shown in FIG. 3.

FIG. 5 is a plan view of the lower wire frame member of the shield of the present invention.

FIG. 6 is a side view of the lower wire frame member of FIG. 5.

FIG. 7 is a plan view of another embodiment of the upper wire frame member.

FIG. 8 is a plan view of another embodiment of the lower wire frame member.

DETAILED DESCRIPTION OF THE INVENTION

FIG. 1 shows a compound bow 11 having an upper limb 13 and a lower limb 15 extending from a central riser 23. At the ends of limbs 13 and 15 ar Ⓡpulley wheels 17 and 19, respectively, around which a string 21 is wound in a conventional manner for compound bows. Central riser 23 is provided with a hand grip 25 provided with a hole 29 to receive a stabilizer rod (not shown). Also shown in FIG. 1 are a lower wire frame member 41, an upper wire frame member 61, camouflage fabric 77, and means for securing each wire frame member to the bow.

As shown in FIGS. 3 and 4, upper wire frame member 61 comprises an inner end section 64 having a reverse curve, an outer arcuate convex end section 68 and straight side sections 62, 66 connecting the ends of inner end section 64 with the ends of outer end section 68 to form a closed loop. Cross-brace members 63, 71, preferably formed from wire, are provided to stiffen upper wire frame member 61 and to provide support for the fastening means for securing wire frame member 61 to upper limb 13 of compound bow 11.

FIGS. 3 and 4 show a preferred embodiment of upper wire frame member 61 in which inner end section 64 comprises a concave central portion 74 and convex end portions 70, 72, and in which convex end portion 70 and concave central portion 74 form one reverse curve, and convex end portion 72 and central portion 74 form another reverse curve. End section 68 comprises a simple curve 76 joining one end of a straight wire 80 with straight side wire 66, and simple curve 78 joining the other end of straight were 80 with straight side wire 62. The present invention also contemplates other configurations of the end sections including the substitution of compound curves for simple curves such as for curved portions 76 and 78. For example, as shown in FIG. 7, instead of comprising a pair of reverse curves, the inner end section of the upper wire frame may comprise a pair of simple curves 70a, 72a with a substantially straight portion 74a replacing concave central portion 74 for joining convex end portions 70a, 72a. Furthermore, outer end section 68 may comprise an arc 81 which is substantially a semicircle as a simple curve, forming a U-shaped outer end section.

While a preferred shape of the wire frame members as shown in the drawings is roughly trapezoidal, the present invention also contemplates substantially rectangular shapes. The width at the widest portion of the frame, i.e., at the inner end section 64 preferably ranges from 12 to about 18 inches, and the width of the narrow, or outer end section 68 preferably ranges from about 8 inches to about 12 inches. The length is typically determined by the bow length and may range from less than about 18 to over 24 inches.

A bracket support 75, preferably formed from wire, interconnects wire frame cross-brace member 71 and inner end section 64 and supports a slotted bracket 73 which is adapted to fit over a scope mount 9. Bracket support member 75 extends parallel to and is shown as being slightly offset from a center line of upper wire frame member 61 in order to interconnect with the scope mount 9 which is slightly to one side of the bow centerline. The connection of slotted bracket 73 with scope mount 9 fixedly secures the inner end section 64 of upper wire frame member 61 to handle riser member 23.

A bracket 69, preferably comprising a metal strip, is mounted on cross-brace member 63 and is secured to wire frame cross-brace member 63 at about the center line of upper frame member 61. Bracket 69 includes a segment 65 secured to and extending outwardly from wire frame cross-brace member 63 and a segment 67 which is angled to bear along its length against the upper portion of upper limb 13. Bracket 69 is secured to upper limb 13 by fastening means 32 such as tape or a strap which is placed around segment 67 and upper limb 13. As will be discussed hereinafter, in a preferred embodiment, segment 67 and upper limb 13 are slidably connected together by fastening means 32.

FIGS. 5 and 6 show lower wire frame member 41 comprising an inner end section 44 having reverse curves, an outer convex member 46, and wire frame portions 40, 42 connecting together the ends of the reverse curves of member 44 with the ends of convex member 46. The lower frame includes a cross-brace member 43, preferably formed from wire, which supports a bracket member 49 and a cross-brace wire frame member 51, which supports a bracket member 54. Bracket member 49 consists of a segment 45 which is mounted on and extends outwardly from wire frame cross-brace 43 and a segment 47 which is angled for bearing against lower limb 15 of bow 11. Bracket member 54 includes a segment 53 which is secured to and extends outwardly from wire frame cross-brace member 51, and an angled segment 55 which is provided with an aperture 57 to accommodate a stabilizer rod (not shown) or a bolt 10 which passes through opening 57 into hole 29 in hand grip 25. Brackets 49 and 54 are preferably formed from a metal strip and are positioned substantially on the center line of wire frame member 41.

Means are provided for securing bracket members 49 and 69 to the limbs 15 and 13, respectively, of the compound bow. In a preferred embodiment these brackets are secured to the bow limbs by strap-like elements such as, for example, by strips of Velcro. In a preferred embodiment, a cushioning strap is placed between the bracket members and the limbs of the bow. In a typical arrangement for securing the bracket member to the bow, a piece of shock-absorbing strap is secured between the bracket and the bow limb, a strip of Velcro holds the bracket against the bow limb, and a piece of camouflage tape covers the Velcro. This arrangement provides shock absorbing characteristics to the shield, and if the surface of the shock absorbing strap which is in contact with the limbs of the bow is smooth, the strap and thus the brackets can slide along limbs 13 and 15 when the bow is flexed The configuration of the closed loops of upper frame member 61 and lower frame member 41 may differ from each other; however, typically there is no advantage in having different configurations for the two loops, and in a preferred embodiment of the present invention, the configurations of the closed loops are substantially the same.

FIGS. 7 and 8 show other embodiments of upper and lower wire frame members, respectively. As shown in FIG. 7, outer arcuate convex end segment 68a is substantially a U-shaped arc, while the inner end section 64a comprises substantially a straight wire portion 74 interconnecting side sections 66a and 62a by simple curves 70a and 72a, respectively.

FIG. 8 shows a modified configuration of a lower wire frame member designed to increase the camouflage over the handle riser member. Wire frame member 41a includes substantially straight side sections 42a and 40a joined together by outer end section 46a which comprises simple curves 50, 52 and substantially straight section 48. The inner end section 44a includes an upwardly extending section defined by an upper end portion of straight side section 40a, a straight horizontal portion 58 and a downwardly extending portion 59.

In a preferred embodiment, the wire members are formed of steel such as, for example, $\frac{1}{8}$ or 3/32 inch diameter carbon steel, and bracket members are formed of carbon steel strip such as, for example, 20 gauge carbon steel, preferably from about $\frac{1}{2}$ inch to 1 inch wide.

The present invention is not limited to any specific covering for the wire frame and any commercially available camouflage fabric or any that may be developed in the future may be useful in the present invention. The present invention contemplates readily removable and replaceable camouflage covering for the wire frames

Having thus described the present invention, the following example is offered to illustrate it in more detail.

EXAMPLE

A camouflage shield made in accordance with FIGS. 3-6 of the drawings is provided for a compound bow. The configurations of closed loops of upper frame 61 and lower frame 41 are identical and the following description based on upper frame 61 also applies to lower frame 41.

Inner end section 64 of upper wire frame member 61 includes a concave portion 74 and convex portions 70 and 72. Concave portion 74 has a radius of curvature of about 12 inches and is depressed inwardly about 0.75 inch at the centerline of the frame. Convex portions 70, 72 have a radius of curvature of about 1.5 inches.

Outer end section 68 includes convex portions 76, 78 each having a radius of curvature of about 3 inches and a substantially straight portion 80 about 3 inches long. Upper wire frame member 61 is about 20 inches in length, about 13 inches in width across inner end section 64 and about 9 inches in width across outer end section 68, measured at the position where cross-brace member 63 joins the straight sides 66, 62. Substantially straight side sections 62, 66 converge toward centerline 30 at an included angle of about 12°.

Side sections 62, 66 are connected together about 5 inches from inner end section 64 by cross-brace 71 and about 3 inches from outer end section 68 by cross-brace member 63.

Slotted bracket support 75 is parallel to and offset about 0.6 inch from the centerline of upper frame member 61. Slotted bracket 73 for engaging a scope mount extends about three inches beyond bracket support 75 and is angled about 7° from the vertical. The slot is about 2 inches deep.

Segment 65 of bracket 69 extends about 3.5 inch beyond cross-brace member 63. End segment 67 of bracket 69 is about 1 inch long and is angled about 15° from a line perpendicular to segment 65.

As shown in the drawings, lower frame member 41 differs only in the brackets which secure lower frame member 41 to the compound bow. Bracket 54 is secured to frame cross-brace 51 at about the centerline of frame member 41. Bracket member 54 comprises segment 53, which extends about 2.75 inches beyond cross-brace member 51, and angled segment 55, about 1 inch long, which is provided with a ¼ inch hole 57 to accommodate a stabilizer rod, or bolt 10 for fitting into the hole in handgrip 25. Bracket member 49 is secured to cross-brace member 43 at about the centerline of frame member 41. Bracket member 49 comprises a outwardly extending segment 45 which extends about 5.5 inches from cross-brace member 43 and an angled segment 47, about 1 inch long. Segments 47 and 55 are angled about 15° from a line perpendicular to segments 45 and 53, respectively.

Various modifications of the present invention may be made by workers skilled in the art without departing from the invention, and it is intended that the invention be limited only as set forth in the following claims.

What is claimed is:

1. A camouflage shield for use with a hunting bow having a centrally located handle riser member and upper and lower limbs secured thereto, said camouflage shield comprising:
   - I upper and lower wire frame members, each of said wire frame members forming a closed loop defining an opening, each of said wire frame members including an inner end section, an outer arcuate convex end section as viewed from outside said frame member, and a pair of side sections connecting said inner end section with said outer end section to form said closed loop;
   - II fastening means for securing said upper wire frame member to said bow with said inner end section adjacent an upper portion of said handle riser member;
   - III fastening means for securing said lower wire frame member to said bow with said inner end section adjacent a lower portion of said handle riser member; and,
   - IV camouflage fabric covering said opening in each of said wire frame members.

2. A camouflage shield according to claim 1 wherein said inner end section of at least one wire frame member comprises an inwardly-extending curved bend to form a concave wire end portion as viewed from outside said frame member.

3. A camouflage shield according to claim 2 wherein said inner end section of at least one wire frame member comprises a pair of convex wire portions for joining said concave wire end portion with said side sections.

4. A camouflage shield according to claim 1 wherein said outer end section of at least one wire frame member is substantially U-shaped.

5. A camouflage shield according to claim 1 wherein said side sections of at least one wire frame member taper inwardly in proceeding from said inner end section to said outer end section.

6. A camouflage shield according to claim 1 wherein said fastening means for securing said lower wire frame member to said bow comprises means for fixedly securing an upper portion of said lower wire frame member to said handle riser member.

7. A camouflage shield according to claim 6 wherein said handle riser member includes a mount for supporting a stabilizing means.

8. A camouflage shield according to claim 1 including means for slidably securing a lower portion of said lower wire frame member to an outer end portion of said lower limb.

9. A camouflage shield according to claim 1 wherein said fastening means for securing said upper wire frame member to said bow comprises means for fixedly securing a lower portion of said upper wire frame member to said handle riser member.

10. A camouflage shield according to claim 9 wherein said bow includes a scope mount means and said means for fixedly securing a lower portion of said upper wire frame member to said handle riser member comprises a member adapted for attachment to said scope mount means.

11. A camouflage shield according to claim 9 wherein said fastening means for securing said upper wire frame member to said bow includes means for slidably securing an upper portion of said upper wire frame member to an outer end portion of said upper limb.

12. A camouflage shield for use with a hunting bow having a centrally located handle riser member and upper and lower limbs secured at inner ends thereof to said handle riser member, said shield comprising:
   - I upper and lower wire frame members, each of said wire frame members forming a closed loop defining an opening, at least one of said wire frame members further including an inner end section having an inwardly-extending curved bend to form a concave end portion as viewed from outside said frame member, an outer arcuate convex end section as viewed from outside said frame member, and a pair of side sections connecting said inner end section with said outer end section to form said closed loop;

II first fastening means for securing said upper wire frame member on said bow adjacent to said upper limb of said bow with the inner end section of said upper wire frame member adjacent to said handle riser member, said first fastening means including means for fixedly securing a lower portion of said upper wire frame member on said handle riser member, and means for slidably mounting an upper portion of said upper wire member to an upper portion of said upper limb;

III second fastening means for securing said lower wire frame member on said bow adjacent to said lower limb of said bow with the inner end section of said lower wire frame member adjacent to said handle riser member and facing the inner end section of said upper wire frame member, the facing inner portions providing an opening in alignment with a line of sight of said bow, said second fastening means including means for fixedly securing an upper portion of said lower wire frame member to said handle riser member, and means for slidably mounting a lower portion of said lower wire frame member to a lower portion of said lower limb; and, IV camouflage fabric covering said opening in each of said wire frame members;

13. A camouflage shield according to claim 12 wherein said centrally located handle riser member includes stabilizer means for fixedly securing an upper portion of said lower wire frame member to said handle riser member, and scope mount means for fixedly securing a lower portion of said upper wire frame member to said handle riser member.

14. A camouflage shield according to claim 12 wherein each of said wire frame members is tapered inwardly in proceeding from the inner end section to the outer end section.

15. A camouflage shield according to claim 14, wherein said side sections of each of said wire frame members taper inwardly in proceeding from said inner end section to said outer end section to form an included angle of from about 5° to about 15°.

16. A camouflage shield according to claim 12 wherein each of said wire frame members is provided with at least one wire cross-piece extending between said side sections.

17. A camouflage shield according to claim 16 wherein each of said first fastening means and said second fastening means includes attachment means for securing said fastening means to said cross-piece(s), 18. A camouflage shield according to claim 12 wherein said means for slidably mounting said upper and lower wire frame members to said bow includes strap means for slidably securing the outer end portions of each frame member to outer end portions of the limbs of said bow.

19. A camouflage shield according to claim 12 wherein each of said side sections is substantially straight.

* * * * *